United States Patent
Saunders

(10) Patent No.: US 10,444,328 B1
(45) Date of Patent: Oct. 15, 2019

(54) HIGH-POWER LASER (HPL) SYSTEM WITH INTEGRAL TRACK ILLUMINATOR

(71) Applicant: Government of the United States, as represented by the Secretary of the Air Force, Kirtland AFB, NM (US)

(72) Inventor: Patrick D. Saunders, Tijeras, NM (US)

(73) Assignee: United States of America as Represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 16/044,133

(22) Filed: Jul. 24, 2018

(51) Int. Cl.
*G01S 7/48* (2006.01)
*G01S 17/02* (2006.01)
*G01S 17/66* (2006.01)
*G01S 17/89* (2006.01)
*F41H 13/00* (2006.01)
*H01S 3/00* (2006.01)
*G01S 7/481* (2006.01)

(52) U.S. Cl.
CPC ........ *G01S 7/4804* (2013.01); *F41H 13/0062* (2013.01); *G01S 7/481* (2013.01); *G01S 17/026* (2013.01); *G01S 17/66* (2013.01); *G01S 17/895* (2013.01); *H01S 3/0071* (2013.01)

(58) Field of Classification Search
CPC ...... G01S 7/4804; G01S 7/481; G01S 17/026; G01S 17/66; G01S 17/895; F41H 13/0062; H01S 3/0071
See application file for complete search history.

(56) References Cited

U.S. PATENT DOCUMENTS

| 8,218,589 B1 | 7/2012 | Saunders | |
| 2009/0231704 A1* | 9/2009 | Chen | G02B 27/283 359/489.08 |
| 2012/0018614 A1* | 1/2012 | King | G02B 26/06 250/201.9 |

* cited by examiner

*Primary Examiner* — Hina F Ayub
(74) *Attorney, Agent, or Firm* — James M. Skorich

(57) ABSTRACT

A high-power laser (HPL) system and method for targeting an object and imaging/tracking the object with an integral track illuminator. The system includes a HPL optically coupled to an aperture sharing element (ASE) and configured to project high-power light at the object, and to switch off for prescribed time intervals to illuminate and track the object. At least one camera is optically coupled to and disposed with respect to the ASE to track the illuminated object over a shared optical path with the HPL when the HPL is switched off for a prescribed time interval.

17 Claims, 3 Drawing Sheets

HIGH-POWER LASER (HPL) SYSTEM WITH INTEGRAL TRACK ILLUMINATOR

STATEMENT OF GOVERNMENT INTEREST

The invention described herein may be manufactured, used, and licensed by or for the Government of the United States for all governmental purposes without the payment of any royalty.

CROSS-REFERENCE TO RELATED APPLICATION

This application is related to co-pending nonprovisional U.S. patent application Ser. No. 16/043859 entitled "Compact Laser Beam Control," filed on the same date herewith, Jul. 24, 2018, and incorporated herein by reference in its entirety.

BACKGROUND

A high-power laser (HPL) system images, tracks and projects high power coherent light to a desired aimpoint on a target object. Typically, passive tracking is sufficient and employed for simplicity. The sun can illuminate a target or its very own heat signature can be used for the tracking system. However, often there is not enough sunlight, the target is cold, or it is at the same temperature as the environment. Thus, active illumination is very often required to sufficiently image and track the target.

In conventional expedients, a track illuminator (TILL) simply shines on a portion of or the entire target that is to be followed or tracked. In a car tracking application, the TILL can be deployed to illuminate the front bumper while the track camera images the reflection of the laser. An algorithm configures a processor to drive a steering mirror and uses the image to track the target car. One difficulty of imaging a target with the HPL itself, is the HPL scatter generated by the HPL system's own optics, and by the atmosphere in the target path. This scatter is usually larger than the return from the target and thus blinds the track sensor from seeing the proper track point. For this reason, TILLs are either positioned outside the imaging path and/or the laser is pulsed. This permits the system to determine a range to the target by timing the round trip of the light, and it allows the track camera to look at the target while the TILL is turned off and not blinding the camera. However, the use of a separate TILL adds size, weight, and increases the complexity of the optic coatings in the optics train and telescope.

Thus, it would be advantageous to provide a HPL system that utilizes the HPL itself to enable illumination and tracking of the target by switching off the high-power coherent light for prescribed time intervals during which the camera can track the target over a shared optical path.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
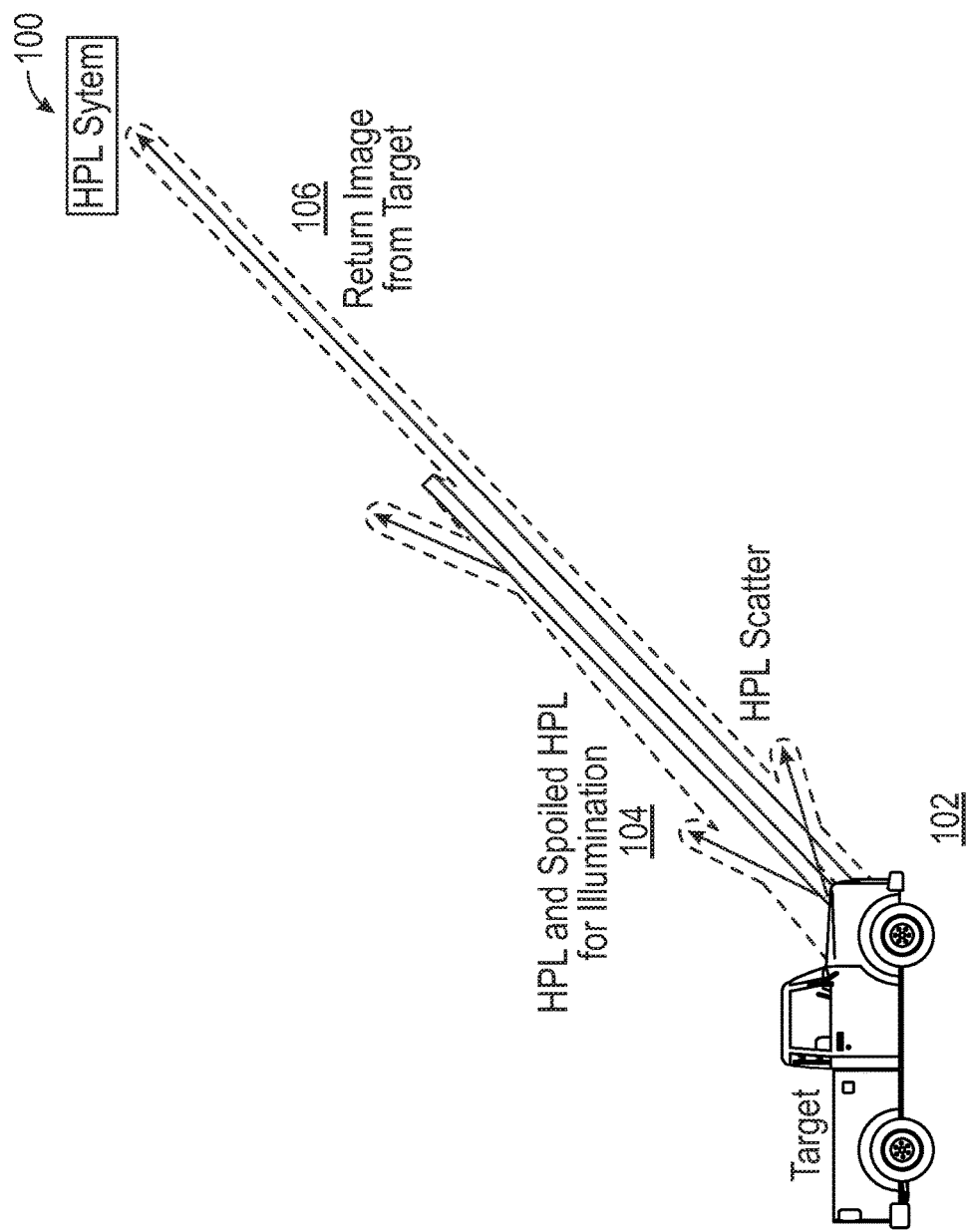
FIG. 1 is a high-level schematic diagram of a general HPL system in accordance with an embodiment of the present disclosure.

Specific embodiments of the disclosure will now be described in detail with reference to the accompanying figures. While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, a high-power laser (HPL) system and method for targeting an object with integrated tracking/imaging over a common optical path is disclosed in accordance with embodiments of the disclosure.

In accordance with an embodiment of the disclosure, there is provided a high-power laser (HPL) system for targeting an object. The system includes a HPL optically coupled to an aperture sharing element (ASE), where the HPL is configured to project high-power light at the object and to switch off for prescribed time intervals to illuminate and track the object. At least one camera is optically coupled and disposed with respect to the ASE to track the illuminated object over a shared optical path with the HPL when the HPL is switched off for a prescribed time interval.

In accordance with another embodiment, the HPL system includes a HPL communicating with at least one controller that directs the HPL to project high-power light at the object, and to switch off for prescribed time intervals to illuminate and track the object. The HPL is optically coupled to an ASE and at least one camera is controlled by the at least one controller and optically coupled and disposed with respect to the ASE to track the illuminated object over a shared optical path with the HPL when the HPL is switched off for a prescribed time interval.

In accordance with another embodiment, the HPL is defocused to illuminate and track the object. One possible method of defocusing the HPL separate from the output telescope is by employing a deformable mirror (DM) positioned between the HPL and ASE.

In accordance with still another embodiment, the at least one camera comprises a HPL camera and a tracking camera, the HPL camera and tracking camera disposed with respect to the ASE to share an optical path to the object.

In accordance with yet another embodiment, the prescribed time interval includes a first sub-interval for clearing scatter from the object, and a second sub-interval for camera integration.

In accordance with still a further embodiment of the disclosure, there is provided a method of targeting an object with a HPL. The method generally includes generating high-power coherent light at the HPL and passing the high-power coherent light via an optical path to an aperture sharing element (ASE). The method further includes projecting the high-power coherent light at the target and switching off the high-power coherent light for prescribed time intervals to enable tracking the target with at least one camera optically coupled and disposed with respect to the ASE, over a shared optical path with the HPL when the HPL is switched off for the prescribed time interval.

FIG. 1 is a high-level schematic diagram of a HPL system 100 targeting an object 102 in accordance with an embodiment of the disclosure. HPL system 100 generates high-power coherent light that is projected (104) at the object 102. As described in detail below, the high-power coherent light is switched off for prescribed time intervals during which the object is tracked by a camera over a shared optical path with the high-power light beam.

Figure 2:
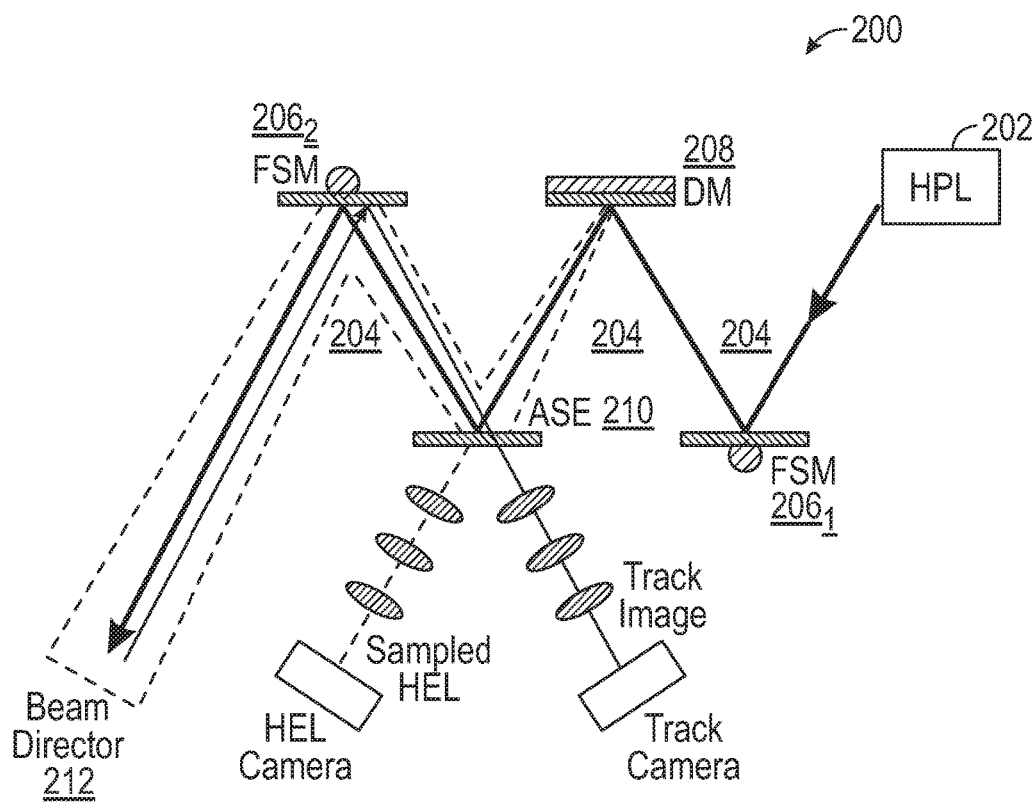
FIG. 2 is a schematic diagram of a HPL system in accordance with an embodiment of the disclosure.

Referring now to FIG. 2, there is depicted a schematic diagram of a HPL system 200 in accordance with an example embodiment of the disclosure. HPL system 200 includes a HPL (coherent light generator) 202 of the type known in the art. The HPL is configured to project coherent light which is directed along an optical path 204 via a fast steering mirror (FSM) $206_1$, deformable mirror (DM) 208, aperture sharing element (ASE) 210, a second FSM $206_2$, to a beam director 212. The beam director 212 projects the coherent light at the target object 102 (FIG. 1). An HEL camera 214 and tracking camera 216 are disposed relative to the ASE 210 as shown. As shown conceptually in the graph of FIG. 3, the target 102 is tracked by camera 214 looking through the optics. Optical coatings allow for the use of a single beam path for both the projected high-power laser while looking at the target via ASE 210. The ASE 210 samples the high-power light beam for cameras and/or sensors to apply control in the high-power path. It also allows the target image, either passive or active, to pass through to a tracking sensor, camera 214, to control the forward path. Conventional methods of polarization control for an illuminator can be applied to the HPL, so it will pass out across the ASE, yet let the return energy pass through the ASE to the track camera.

Figure 3:
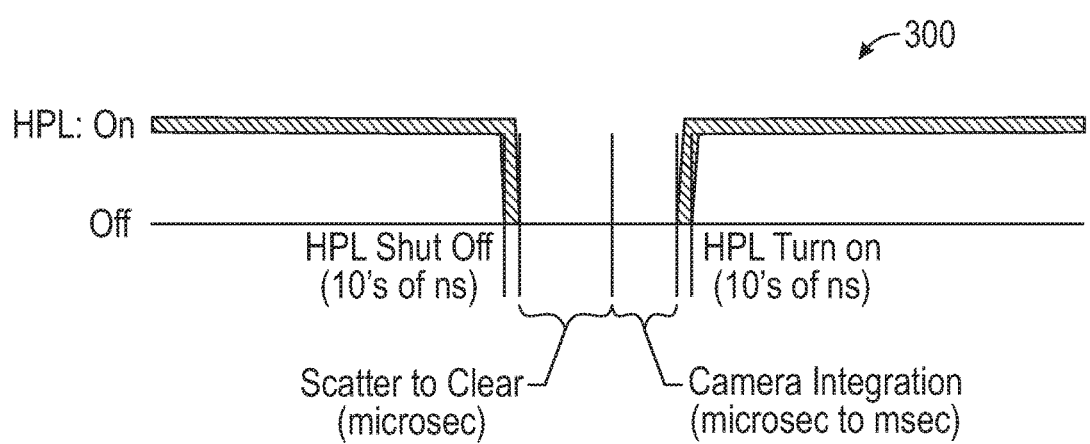
FIG. 3 is a graphical depiction of an exemplary power-down scheme for a prescribed time interval for a single negative pulse in accordance with an embodiment of the disclosure.

FIG. 3 is a graphical depiction of an exemplary power-down scheme 300 for a single negative pulse in accordance with an embodiment of the disclosure. In an exemplary scenario, assume a requirement to have a clear path of 50 meters, the laser needs to be powered off for about a third of a microsecond (3.33 e−7 s), or the time for the projected coherent light to travel the 100 m (50 m out and back where time=distance/speed of the light). A wait (power-down) time interval of ⅓ of a μs (i.e., while the HPL is off or mostly off, is sufficient to clear scatter from the system's own optics and the immediate area of the atmosphere proximate to or just in front of the HPL system. It will be appreciated by those skilled in the art that either different time intervals may be utilized as required to sufficiently clear the path for imaging/tracking based on the parameters and design of the HPL system and the atmospheric conditions in the path to the target. For example, waiting two µs enables 300 meters of clear path.

After the wait, the return of the HPL from the target can be observed by opening the shutter or gate on the track camera. Since the power used for the illumination can be much greater than normally generated by a typical track illuminator, the camera integration time can be short. Even with a relatively insensitive camera, an integration time of less than one microsecond is more than enough to capture a good image of the target. Adding some time to account for timing uncertainties and the HPL switching time, the total time off for the HPL is less than four microseconds while waiting to clear over 300 meters of path and one microsecond camera integration time (FIG. 3). If we are trying to track at extreme range and not engage the target, we can have the camera integrate up to nearly 50% of the total time. We can also reduce the track bandwidth and subsequently reduce the sample rate when not engaging and only tracking to allow for longer integration times for these extreme low signal cases.

In choosing a track camera for incorporation into the embodiments of the disclosure, it will be appreciated that the track image is the same wavelength as the hit-spot return (i.e., aimpoint reflections). This necessitates a camera having a wide dynamic range and the ability to use or gate only the area for tracking while ignoring the hit-spot area on the image. These issues generally arise in HPL systems, but must be specifically addressed in the inventive embodiments and to include the polarization effects of the target if it melts.

It will further be appreciated that the specific engagement scenario and HPL system configuration will determine how often the HPL system will need to image the target for tracking. If a closed loop track rate of over 50 hertz is utilized as an example, a sample rate of negative pulses approaching one kilohertz would be required. Using the example discussed above with four µs, at one KHz the HPL total off time of four µs per second is 0.4% of the time. Advantageously, this is relatively insignificant to the total energy projected on target. Even if a 500 Hz closed loop control system with a 10-kHz sample rate were required to deal with a turret in the airstream, it would mean only a 4% reduction in the total energy rate projected on the target.

It is important to focus the HPL on the target aimpoint to cause melting of the target, while at the same time having a wider beam on a track point which will most likely be at a different location. While only tracking and not yet trying to engage for effect, the HPL can be defocused to flood illuminate the target. The power for the HPL can be throttled to lower power levels or use full power for very long ranges as discussed above. As shown in example embodiment of FIG. 2, this can be accomplished via the DM 208, or by inserting an optic in the HPL path to defocus the beam. The defocus is implemented before the ASE 210, not with the beam director or forward path which is focused on the target, for a good track image. In general, the aimpoint and the track-point are not identical. Thus, the critical issue is getting enough energy on the track-point while the HPL is focused on the aimpoint. In this regard, the DM 208 may be used, which can be the same as that utilized for low-power tracking, to differentially point just a small portion of the HPL to the track-point, while the clear majority of the beam is pointed and focused on the aimpoint. A kilowatt of power is greater than the output of most typical illuminators, and more than sufficient for targets at less than 10 kilometers assuming a 30-cm imaging aperture. If the HPL is on the order of 100 kilowatts, this is only 1% of the total power. In addition, it is also possible that enough forward scatter is provided with enough energy on an acceptable track point such that a sufficient return is generated and no further power need be diverted from the HPL. This implementation is dependent on the beam quality of the HPL and the atmospheric conditions between the HPL system and the target. Specific solutions can be implemented depending on the overall design and mission of the system.

Advantageously, the HPL can be quickly switched fast, for a relatively short time, and at optimum times so as minimize any reduction of the average HPL power on target. In this regard, it will be appreciated that the HPL has sufficient power of a magnitude such that a small amount thereof diverted for tracking, plus the off time and number of off times will not significantly increase the time to obtain the desired HPL target effect.

For certain conceivable scenarios and specific targets, the required off time for the HPL for tracking purposes can be a significant percentage of the HPL. Thus, if the total time-averaged power diverted is greater than, for example, 10%, the time necessary to lase the target to obtain the desired effect may increase significantly. Relevant factors in this regard include the power of the HPL, range to target, target size, beam diameter, beam quality, etc. As an example, to engage a small drone at long range, an exemplary HPL is configured to output 50 kilowatts of power with a beam director of 0.3 meters. Assuming the drone is queued by radar or another observer, the system might be able to track the target at over 50 kilometers and possibly incapacitate the drone at well over 10 kilometers.

Figure 4:
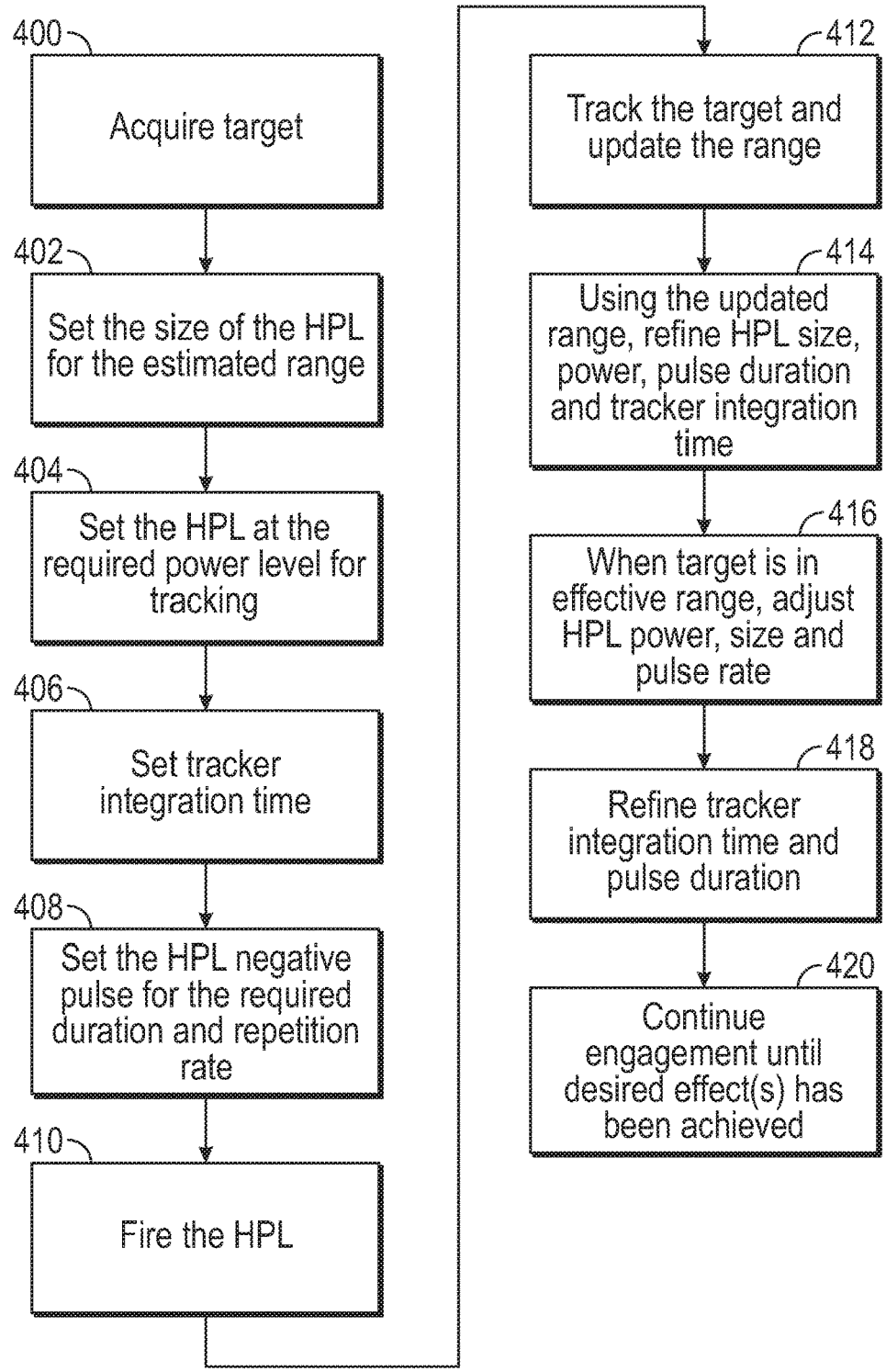
FIG. 4 is a flow diagram of a method in accordance with an embodiment of the disclosure.

Referring now to FIG. 4, there is depicted a flow diagram of a method in accordance with an embodiment of the disclosure. The process flow starts at block 400 with the system acquiring a target object. This can be done in a variety of ways as will be understood by those skilled in the art, and the specifics thereof are not relevant to this disclosure. This acquisition initiates the following generalized sequence of steps in accordance with an example embodiment of the disclosure, but is not an all-inclusive description of a full system. In this regard, it is assumed that the system has some idea of range to the target upon acquisition. If not, a ranging scan may be needed, but this process is known in the art and need not be covered here. Accordingly, the assumption for purposes of the present disclosure is that the system has a rough range to the target object. In block 402, having the rough range to the target object, the optics are then adjusted so the size of the HPL will illuminate the target for the tracker while the telescope optics are focused at the target object such that the tracker image is sharp. In block 404 the HPL power level for tracking the target object at that range is set. At block 406, the track camera integration time is set for the expected return power in the correct polarization reflected off the target object for the estimated range. At block 408, the HPL negative pulse duration is set to reject HPL scatter for a sufficiently clear path and to include the tracker integration duration. The negative pulse repetition rate is set high enough to reject sufficient jitter in order to track the target object. At block 410, the HPL is then fired at the target object with these set values. At block 412, the tracker system tracks the target and updates the range by counting the time between an outgoing negative pulse and a return negative pulse. At block 414, the accurate range calculation can be used to refine the HPL size at the target object, the power required for tracking, and the related track camera integration time and thus the negative pulse duration. At block 416, once the target object is determined to be in effective range, the HPL size and power can be adjusted to achieve the desired effects on the target object. The negative pulse repetition rate will potentially be different from that needed for tracking and should be set based upon jitter rejection and the integrated energy over time as needed to attain the desired effects on the target object. At block 418, the tracker integration time and the related pulse duration are adjusted for the new HPL return levels from the target object track point. At block 420, the process continues and keeps firing the HPL until the desired effect(s) on the target object has been achieved, and then the system ceases the engagement.

The above systems, devices, methods, processes, and the like may be realized in hardware, software, or any combination of these suitable for an application. The hardware may include unique digital processing, a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in several ways. At the same time, processing may be distributed across devices such as the various systems described above, or all the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A high-power laser (HPL) system for targeting an object, comprising:
    a HPL optically coupled to an aperture sharing element (ASE);
    the HPL system being configured to project a defocused part of the HPL on the object and concurrently project a focused part of the HPL on the object, whereby the object is illuminated by the defocused part of the HPL and affected by the focused part of the HPL;
    further configuring the HPL system to switch off the HPL during prescribed time intervals; and at least one camera being optically coupled and disposed with respect to the ASE to track the illuminated object over a shared optical path with the HPL when the HPL is switched off.

2. The HPL system of claim 1, further comprising a deformable mirror (DM) in the shared optical path for defocusing the HPL when imaging and tracking the object.

3. The HPL system of claim 2, wherein the DM is disposed in the optical path between the HPL and the ASE.

4. The HPL system of claim 1, wherein:
the at least one camera is comprised of at least two cameras, including an HPL camera and a tracking camera; and
the HPL camera being for measuring an angle subtended by the focused part of the HPL and a tracking line-of-sight established by the tracking camera, whereby
the HPL is pointed at the object independently of the tracking line-of-sight.

5. The HPL system of claim 1, wherein each of the prescribed time intervals includes a first sub-interval for clearing scatter from the object, and a second sub-interval for camera integration.

6. A method of targeting an object with high-power laser (HPL), comprising:
generating the HPL comprised of focused and unfocused parts;
passing the HPL via an optical path to an aperture sharing element (ASE);
projecting the HPL at the object and illuminating the object with the unfocused part of the HPL;
switching off the HPL for prescribed time intervals; and
tracking the object with at least one camera optically coupled and disposed with respect to the ASE, over a shared optical path with the HPL with the HPL is switched off.

7. The method of claim 6, further comprising adjusting a comparative relationship between the focused and unfocused parts by defocusing the HPL by using a deformable mirror (DM) disposed in the shared optical path.

8. The method of claim 7, wherein the DM is disposed in the optical path between the HPL and the DM.

9. The method of claim 6, wherein:
the at least one camera comprises at least two cameras, including a HPL camera and a tracking camera; and
the HPL camera and the tracking camera are disposed with respect to the ASE to share an optical path to the object.

10. The method of claim 9, further comprising measuring an angle subtended by the focused part of the HPL and a tracking line-of-sight established by the tracking camera.

11. The method of claim 6, wherein each of the prescribed time intervals includes a first sub-interval for clearing scatter from the object, and a second sub-interval for camera integration.

12. A high-power laser (HPL) system for targeting an object, comprising:
a HPL communicating with at least one controller which directs the HPL to project high-power light to illuminate the object;
an aperture sharing element (ASE); and
at least two cameras, including a HPL camera and a tracking camera, for communicating with at least one controller, and being optically coupled and disposed with respect to the ASE to track the illuminated object over a shared optical path with a HPL when the HPL is switched off during one of the prescribed time intervals.

13. The HPL system of claim 12, wherein the HPL is defocused to illuminate the object.

14. The HPL system of claim 13, further comprising a deformable mirror (DM) in the shared optical path for defocusing the HPL when illuminating the object.

15. The HPL system of claim 14, wherein the DM is disposed in the optical path between the HPL and the ASE.

16. The HPL system of claim 12, wherein the HPL camera and tracking camera are disposed with respect to the ASE to share the optical path to the object.

17. The HPL system of claim 12, wherein each of the prescribed time intervals includes a first sub-interval for clearing scatter from the object, and a second sub-interval for camera integration.

* * * * *